(12) United States Patent
Divsalar et al.

(10) Patent No.: US 12,040,836 B2
(45) Date of Patent: Jul. 16, 2024

(54) WAVELENGTH DIVISION MULTIPLE ACCESS FOR LONG RANGE OPTICAL COMMUNICATIONS

(71) Applicant: CALIFORNIA INSTITUTE OF TECHNOLOGY, Pasadena, CA (US)

(72) Inventors: Dariush Divsalar, Pasadena, CA (US); William H Farr, Pasadena, CA (US); Makan Mohageg, Pasadena, CA (US); Samuel J Dolinar, Pasadena, CA (US); Matthew D Thill, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 18/324,433

(22) Filed: May 26, 2023

(65) Prior Publication Data

US 2023/0327774 A1  Oct. 12, 2023

Related U.S. Application Data

(62) Division of application No. 17/530,258, filed on Nov. 18, 2021, now Pat. No. 11,728,896.

(Continued)

(51) Int. Cl.
*H04B 10/50* (2013.01)
*H04B 10/54* (2013.01)
(Continued)

(52) U.S. Cl.
CPC ........... *H04B 10/503* (2013.01); *H04B 10/54* (2013.01); *H04J 14/005* (2013.01); *H04L 25/4902* (2013.01)

(58) Field of Classification Search
CPC ..... H04B 10/503; H04B 10/54; H04J 14/005; H04L 25/4902
(Continued)

(56) References Cited

U.S. PATENT DOCUMENTS 7,660,535 B2 * 2/2010 Goto .................. H04B 10/506
398/189
10,009,115 B2 * 6/2018 Caplan ................ H04B 10/67
(Continued)

FOREIGN PATENT DOCUMENTS

EP       1734622 A1 * 12/2006  ......... H01S 3/06754

OTHER PUBLICATIONS

Dariush Divsalar et al., "Wavelength Division multiple access for deep space optical communication" Jul. 7, 2020 IEEE Conference (Year: 2020).*

(Continued)

*Primary Examiner* — Abbas H Alagheband
(74) *Attorney, Agent, or Firm* — Steinfl+Bruno LLP

(57) ABSTRACT

Methods and devices implementing a combination of multi-dimensional pulse position modulation (PPM) with wavelength division multiplexing (WDM) or wavelength division multiplexing multiple access (WDMA) for long range space communications are disclosed. The described multi-dimensional PPM scheme can use the laser wavelength and/or polarization as the additional dimension(s) to the time dimension. Through examples it is shown that the disclosed teachings result in a higher photon information efficiency. Various exemplary embodiments are also presented to highlight the applications benefiting from the disclosed methods and devices.

17 Claims, 13 Drawing Sheets

Related U.S. Application Data

(60) Provisional application No. 63/115,772, filed on Nov. 19, 2020.

(51) Int. Cl.
  *H04J 14/00* (2006.01)
  *H04L 25/49* (2006.01)

(58) Field of Classification Search
  USPC .......................................................... 398/78
  See application file for complete search history.

(56) References Cited

U.S. PATENT DOCUMENTS

| | | | | |
|---|---|---|---|---|
| 10,313,010 | B2* | 6/2019 | Everett | H04B 10/503 |
| 10,374,723 | B2* | 8/2019 | Caplan | H04B 10/11 |
| 11,728,896 | B2 | 8/2023 | Divsalar et al. | |
| 2003/0072050 | A1* | 4/2003 | Vrazel | H04B 10/541 398/9 |
| 2010/0309480 | A1* | 12/2010 | Furusawa | G01B 9/02091 356/519 |
| 2014/0133868 | A1* | 5/2014 | Krause | H04B 10/5053 398/184 |
| 2017/0222720 | A1* | 8/2017 | Farr | H04B 10/54 |
| 2019/0229805 | A1* | 7/2019 | Velazco | H04B 10/503 |
| 2023/0254045 | A1* | 8/2023 | Yoshino | H04B 10/5059 398/189 |

OTHER PUBLICATIONS

Dariush Divsalar et al., "Optical CDMA for a Constellation of CubeSats Mar. 10, 2018", IEEE Conference (Year: 2018).*

* cited by examiner

WAVELENGTH DIVISION MULTIPLE ACCESS FOR LONG RANGE OPTICAL COMMUNICATIONS

CROSS REFERENCE TO RELATED APPLICATIONS

The present application is a divisional application of U.S. application Ser. No. 17/530,258, filed on Nov. 18, 2021, which claims priority to U.S. Prov. App. No. 63/115,772, filed on Nov. 19, 2020, the contents of both of which are incorporated herein by reference in their entirety.

STATEMENT OF GOVERNMENT GRANT

This invention was made with government support under Grant No. 80NMO0018D0004 awarded by NASA (JPL). The government has certain rights in the invention.

FIELD

The presented disclosure is related to space optical communications, and more particularly to devices and methods implementing wavelength division multiplexing (WDM) or wavelength division multiplexing multiple access (WDMA) for long range space communications.

Definition

Throughout this document the term "one-dimensional M-ary pulse position modulator (M-PPM) is referred to a form of signal modulator in which m=log 2M message bits are encoded by transmitting a single pulse (or a single optical pulse in the case of an optical communication system) in one of M possible required time slots or windows. This can be repeated every T seconds, such that the resulting bit rate for transmission is m/T. Such modulator is said to comprise M different time slots for pulse allocation. As an example, in a 64-PPM, for every 6 message bits one pulse during a corresponding time slot out of 64 existing time slots is transmitted. Throughout this document, the above-mentioned time parameter T is referred to as the "PPM symbol transmission period" or simply "transmission period".

BACKGROUND

Optical communication systems for long range applications in space have been developed primarily for a single wavelength communication. Photon information efficiency (PIE), i.e. number of bits per photon, is an essential figure of merit of such systems. Achieving a greater PIE is often highly desired.

A one-dimensional (M-PPM) scheme is commonly implemented when designing optical systems for long range space communications. In such one-dimensional modulation scheme, transmission is performed in correspondence with a single dimension, a time dimension. In other words, a pulse (or an optical pulse in the case of optical communication systems) is transmitted during one slot out of M slots of the PPM transmission symbol (frame). In order to achieve higher transmission speed (e.g. multi-Giga bits per second), a larger number of slots (M) is needed for a given duration T. This imposes stringent requirements on the implementation and substantial challenges in the overall system design.

FIG. 1 shows the block diagram of a prior art one-dimensional PPM optical transmitter. Data (101) is first coded (102) and then the coded data modulate the laser (103) according to PPM scheme (104). The modulated optical signal is then generally amplified through optical amplifier (105) before being transmitted. When implementing the transmission system of FIG. 1 for long range space communication applications, in order to achieve a higher PIE as mentioned previously, a larger number of slots M, higher peak power and small slot durations are needed. This is often not achievable given the current state of the laser technology.

SUMMARY

The described methods and devices address the above-mentioned design challenges and provide solutions to the described problems. According to the disclosed teachings, by combining multi-dimensional M-PPM schemes with existing technologies such as wave division multiplexing (WDM), wave division multiple access (WDMA), or WDMA combined with optical coded division multiple access (CDMA), higher photon information efficiencies can be achieved using the current laser technology.

According to a first aspect of the present disclosure, a communication system including an optical transmitter is provided, the optical transmitter comprising: a plurality of lasers; and a plurality of pulse position modulators configured to receive data bits; wherein: a transmission period of the optical transmitter comprises a plurality of time slots; and based on the data bits, the plurality of pulse position modulators are configured to select, during each transmission period: one time slot of the plurality of time slots for transmission of an optical pulse; and one laser of the plurality of lasers to transmit the optical pulse at a selected time slot.

According to a second aspect of the present disclosure, communication system including an optical transmitter is provided, the optical transmitter comprising: a mode locked laser configured to generate a train of optical pulses; an electro-optic modulator (EOM) configured to receive the train of optical pulses; a pulse position modulator; an optical demultiplexer and an optical multiplexer; a plurality of intensity modulators; wherein: the pulse position modulator is configured to receive data bits, and based on the received data bits, to select an optical pulse through the EOM at a selected time slot of plurality of time slots; the optical demultiplexer is configured to demultiplex a selected optical pulse into a plurality of beams with corresponding plurality of wavelengths; the pulse position modulator is further configured to select, in correspondence with a wavelength, an intensity modulator of the plurality of the intensity modulators; the selected intensity modulator is configured to modulate the selected optical pulse to generate an intensity modulated optical pulse; and the optical multiplexer is configured to multiplex the intensity modulated optical pulse to generate an optically multiplexed signal.

According to a third aspect of the present disclosure, a communication system including an optical transmitter is provided, the optical transmitter comprising: a plurality of lasers; and a plurality of pulse position modulators configured to receive data bits; wherein: a transmission period of the optical transmitter comprises a plurality of time slots; and based on the data bits, the plurality of pulse position modulators are configured to select, during each transmission period: one time slot of the plurality of time slots for transmission of an optical pulse; one polarization state; and one laser of the plurality of lasers to transmit, the optical pulse at a selected time slot, the laser having the one polarization state.

According to a fourth aspect of the present disclosure, a method of increasing a photon information efficiency in an optical transmission is disclosed, the method comprising: dividing a transmission period into a plurality of time slots; providing a plurality of lasers with wavelengths different from one another; receiving data bits; based on the received data bits, selecting a time slot of the plurality of time slots and a laser of the plurality of lasers; using the selected laser, transmitting an optical pulse at the selected time slot.

Further aspects of the disclosure are provided in the description, drawings and claims of the present application.

DETAILED DESCRIPTION

As mentioned previously, necessary high PIEs for long range space communication applications may not be achievable by implementing a one-dimensional PPM scheme. According to the teachings of the present disclosure, this problem is solved by expanding the number of dimensions associated with the PPM scheme. As an example, a two-dimensional PPM may be envisaged wherein the modulation is performed in correspondence with time (first dimension) and an additional dimension such as wavelength.

Figure 1:
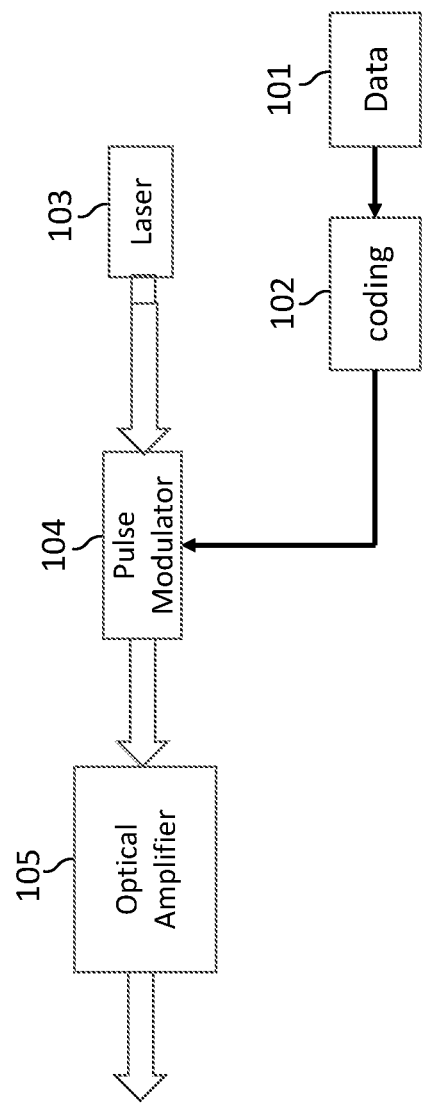
FIG. 1 shows the block diagram of a prior art one-dimensional PPM optical transmitter.
Figure 2A:
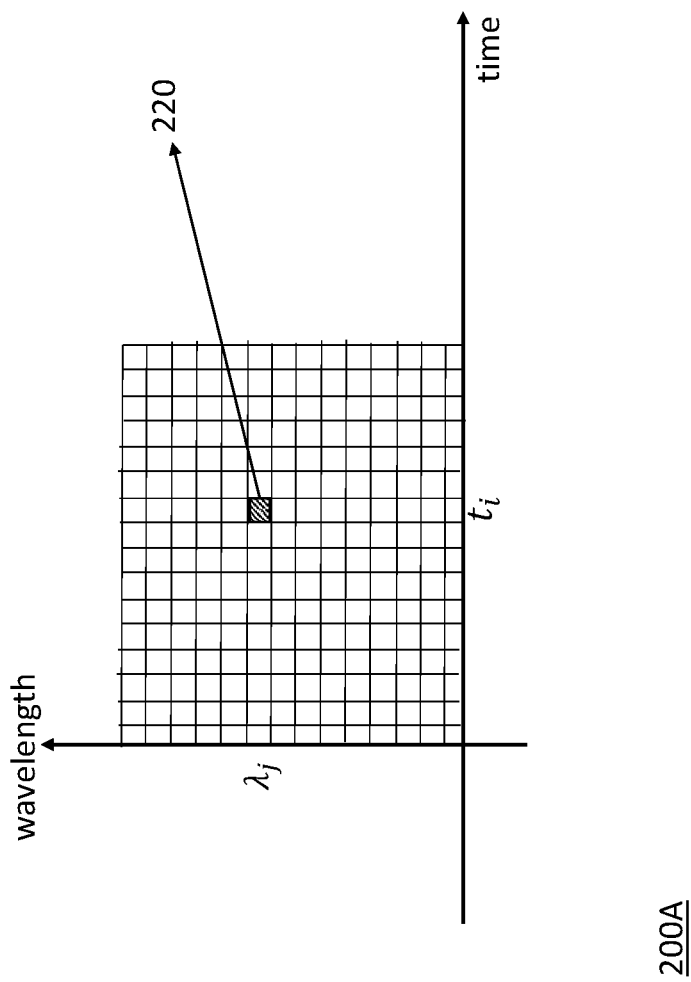
FIG. 2A shows an exemplary two-dimensional grid along both the time and wavelength axes formed for pulse allocations according to an embodiment of the present disclosure.

This is depicted in diagram (200A) of FIG. 2A wherein a two-dimensional grid along both time (horizontal) and wavelength (vertical) axes is formed for pulse allocations in a PPM scheme. In other words, each cell in such grid can be used to transmit a corresponding optical pulse. As an example, cell (220) represents the time-wavelength pair ($t_i$, $\lambda_j$). As such, an optical pulse with wavelength $\lambda_j$ may be submitted at time slot ($t_i$) in correspondence with such pair. As will be described more in detail later, the added second dimension may correspond to wavelengths of the lasers implemented as part of, for example, a) a WDM system, b) a WDMA system, or c) a combination of WDMA with CDMA.

Figure 2B:
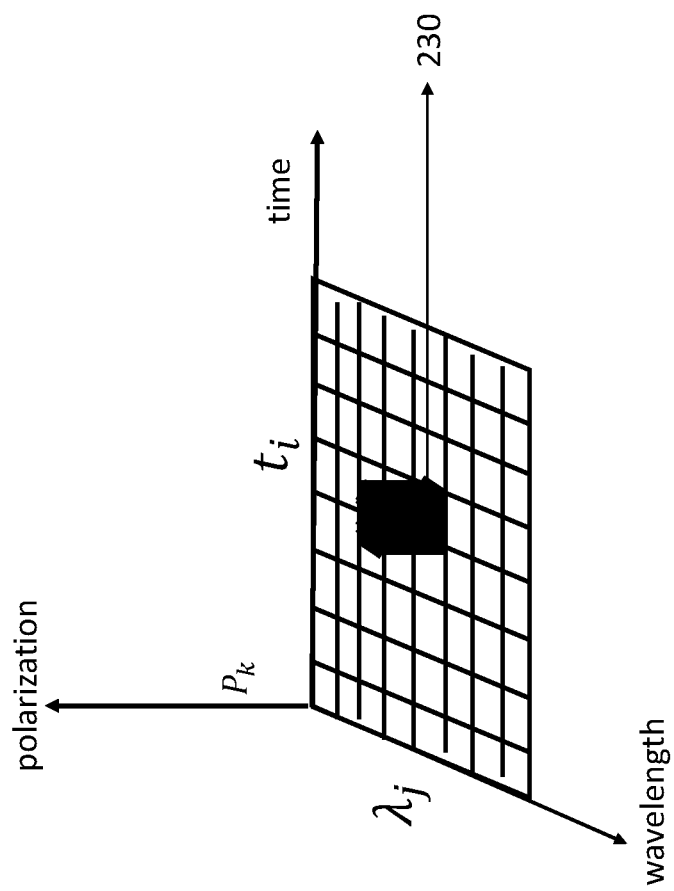
FIG. 2B shows an exemplary three-dimensional grid along the time, wavelength, and polarization axes formed for pulse allocations according to an embodiment of the present disclosure.

According to an aspect of the present disclosure, the number of dimensions of the PPM scheme can be further expanded to include, in addition to time and wavelength, a third dimension such as polarization. This defines a three-dimensional M-PPM modulation scheme illustrated in diagram (200B) of FIG. 2B where a three-dimensional grid is formed along the (time, wavelength, polarization) axes. Similarly to what was described with regards to diagram (200A) of FIG. 2A, in correspondence with each cell of such grid, a separate optical pulse may be submitted when implementing this three-dimensional M-PPM scheme. As an example, cell (230) represents the time-wavelength-polarization triplet ($t_i$, $\lambda_j$, $p_k$). As such, an optical pulse with wavelength $\lambda_j$ and polarization state $p_k$ may be submitted at time slot ($t_i$) in correspondence with such triplet. As will be discussed later, embodiments may also be envisaged where in correspondence with triplet ($t_i$, $\lambda_j$, $p_k$), multiple optical pulses may be submitted.

In order to further clarify the above disclosed teachings, in what follows, several embodiments according to the present disclosure will be described in greater detail. The presented embodiments adopt and modify various technologies to implement the described teachings.

Use of multi-wavelength optical communication such as high-capacity wavelength division multiplexing WDM and communication between multiple small (i.e. compact) spacecraft or miniaturized cubic satellites (also known as CubeSats) and earth using WDMA has not been previously considered for long range space communications. In accordance with the teachings of the present disclosure, a combination of WDM or WDMA with multi-dimensional M-PPM modulation schemes as disclosed above may be used to design and implement optical communication systems offering higher PEIs that are suitable for long range space communication applications.

Figure 3A:
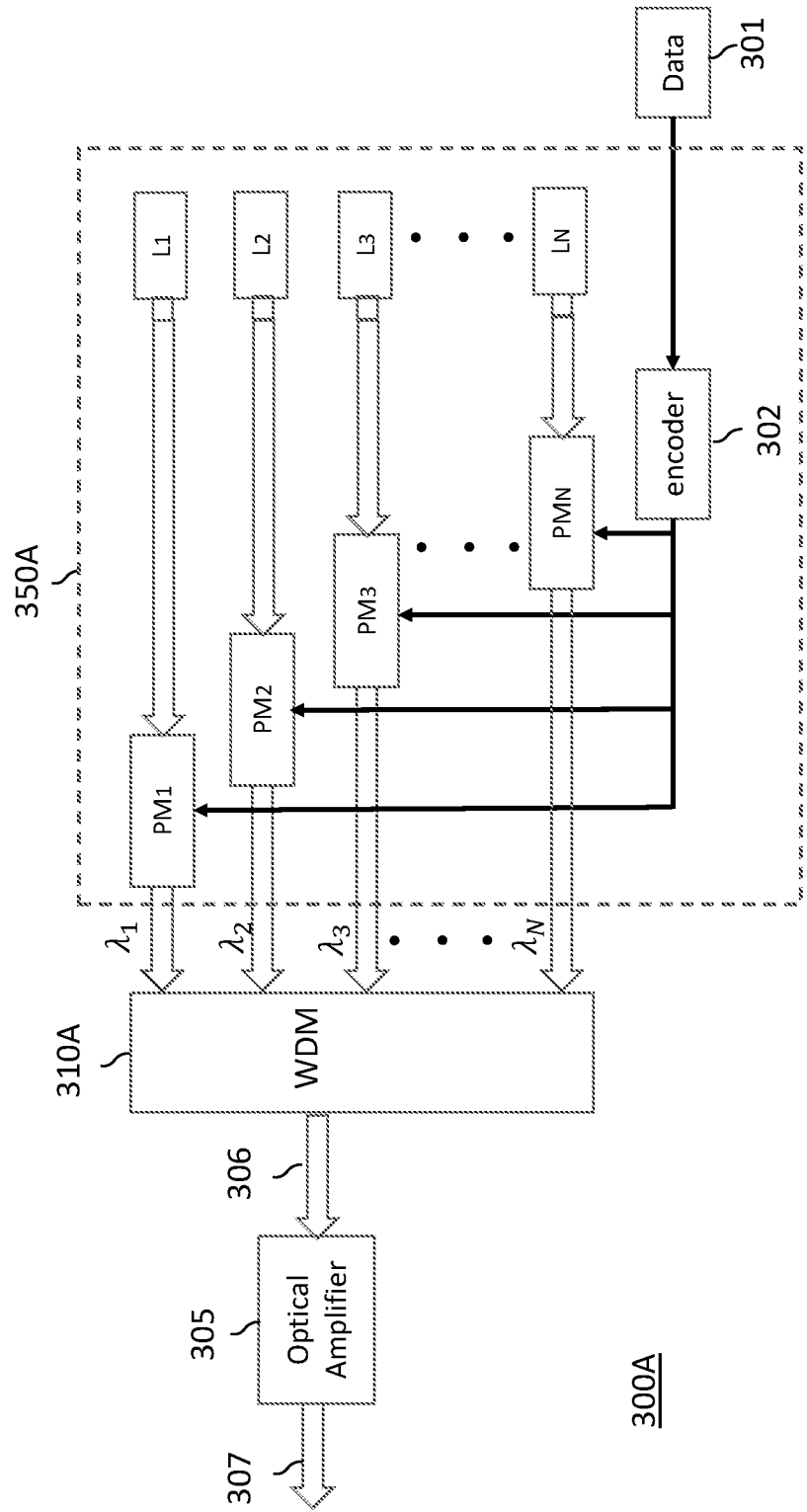
FIG. 3A shows a block diagram of an exemplary two-dimensional M-PPM optical transmitter according to an embodiment of the present disclosure.

FIG. 3A shows a block diagram of an exemplary two-dimensional M-PPM optical transmitter (300A) in accordance with the teachings of the present disclosure. Optical transmitter (300A) comprises encoding block (350A) including an array of N lasers ($L_1$, ..., $L_N$) with respective wavelengths ($\lambda_1$, ..., $\lambda_N$), an array of N modulators ($PM_1$, ..., $PM_N$) implementing the PPM scheme, and encoder (302). In other words, modulators ($PM_1$, ..., $PM_N$) may be pulse position modulators. In such PPM scheme, the transmission period is divided into several time slots. PPM Optical transmitter (300A) further comprises wavelength division multiplexer (310A) and optical amplifier (305).

High speed data (301) is first encoded through encoder (302). Based on the encoded data, a time slot (e.g. $t_i$) for optical pulse transmission and also, a laser having a wavelength of, e.g. $\lambda_j$, are selected. In other words, the combination of the selected laser and respective modulator ($PPM_j$) is configured to transmit the optical pulse with wavelength $\lambda_j$ at time slot $t_j$. During operation, the resulting optical pulses are then multiplexed into one beam (306) via wavelength division multiplexer (310A). Beam (306) is then optically amplified via optical amplifier (305) to generate the amplified beam (307) which will then be transmitted. The embodiment of FIG. 3A may be implemented using an arbitrary number N of lasers. As will be discussed more in detail later, embodiments may also be implemented wherein multiple data streams in correspondence with multiple encoders may be supported, and wherein each modulator is coupled to a respective encoder In order to describe the overall performance of the embodiment shown in FIG. 3A, an exemplary transmitter with N=16 lasers (16 wavelengths) and M=64 (i.e. 64-PPM) is considered. According to the teachings of the present disclosure, such transmitter is equivalent to a 1024-PPM transmitter offering a higher photon information efficiency. Moreover, in this transmitter, the total average power is equivalent to the average power of a single laser since at any given time one laser can send an optical pulse. By virtue of using WDM with M-PPM, the PIE can be increased from 6 bits per photon to 10 bits per photon using 64-PPM with 16 wavelengths. For a given laser peak power $P_{peak}$, for one-dimensional 64-PPM, the average laser power is $P_{peak}/64$. For two-dimensional PPM, using 16 wavelengths, and 64 time slots per wavelength, the average power per laser is $P_{peak}/(64 \times 16)$.

With continued reference to FIG. 3A, if CMI-PPM represent the channel capacity of M-PPM modulation in bits per channel use (or equivalently bits per PPM symbol), the capacity per dimension is $C_{M-PPM}/M$ in bits per PPM slot. The $C_{M-PPM}/M$ value represents the dimensional information efficiency (DIE). The PIE is then defined as $C_{M-PPM}/n_s$ in bits per photon where $n_s$ represents the average number of received signal photons per PPM symbol. Electromagnetic waves are fundamentally governed by the laws of quantum mechanics, the maximum possible rate of reliable communication at optical wavelengths is being ultimately limited by the Holevo capacity in bits per dimension in absence of background noise as $C_{Hol} = g(n_s) = (1+n_s)\log_2(1+n_s) - n_s \log_2(n_s)$ Thus, the ultimate PIE is $g(n_s)/n_s$. Since the Holevo capacity $g(n_s)$ is bits per dimension, the $n_s$ here also is defined per dimension. This is consistent with the definition $C_{M-PPM}/n_s$ since it can also be written as $(C_{M-PPM}/M)/(n_s/M)$. The expression for the Holevo capacity in the presence of background noise can be expressed as:

$C_{Hol} = g(n_s+n_b) - g(n_b)$ in bits per dimension, where $n_b$ is the average received number of background noise per dimension. Then the PIE for the noisy case is:

$$PIE = \frac{g(n_s + n_b) - g(n_b)}{n_s}$$

With further reference to the example above, as described in the U.S. Prov. App. No. 63/115,722 incorporated herein by reference in its entirety. a combination of WDM with a two-dimensional M-PPM with N=16 and M=64, will result in an improvement of PIE both in presence and absence of background noise.

Figure 3B:
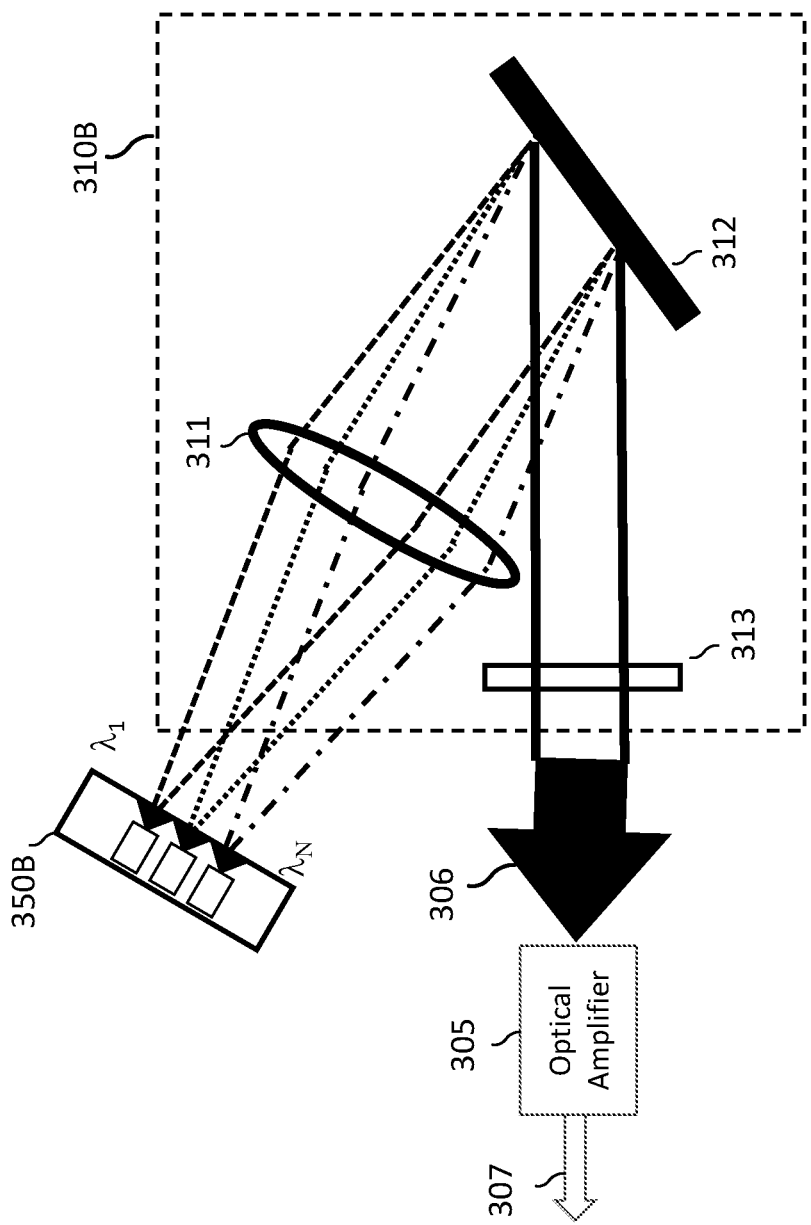
FIG. 3B shows a block diagram of an exemplary two-dimensional M-PPM optical transmitter according to an embodiment of the present disclosure.

FIG. 3B shows a block diagram of an exemplary two-dimensional M-PPM optical transmitter (300B) according to an embodiment of the present disclosure. Optical transmitter (300B) comprises encoding block (350B) and wavelength division multiplexer (310B) including lens (311) and diffraction grating (312). The previously described encoding block (350A) of FIG. 3A represents an exemplary implementation of encoding block (350B). Similarly, wavelength division multiplexer (310B) represents an exemplary implementation of wavelength division multiplexer (310A) of FIG. 3A. Optically modulated data coming out of encoding block (350B) comprise separated beams corresponding to wavelengths ($\lambda_1$, . . . , $\lambda_N$). Only three of such beams are shown (by way of different patterns) in FIG. 3B for increased clarity. The separate optical beams are collimated into a single beam (306) after passing through the lens (311) and diffraction grating (312). After passing through coupler (313), the single beam is amplified through optical amplifier (305) to generate and optically amplified beam (307) which is then transmitted to, for example, a distant user. The element (313) represents optical lens or similar optical elements such as a concave mirror, which optionally may be integrated with the diffraction grating element (312).

With further reference to FIG. 3B, in some applications, the "encoder" (302) can represent a combination of channel encoder (a Forward Error Correction (FEC) code) and a mapping from output of channel encoder to a sequence that is required to control which slot duration $t_i$ in M-PPM should contain the laser pulse with a polarization $p_k$ for a particular wavelength $\lambda i$ and which ones should not pass the laser beam. This can be used for implementation of 2D-PPM or 3D-PPM (the one with polarization switching). The mapper also can be used to generate multiple optical pulses in 2D or 3D grid for various combinations of triple $(t_i, \lambda_j, p_k)$ for any combination of $t_i$, $\lambda_j$, (and polarization $p_k$) for several i's and j's. The lasers ($L_1$, . . . , $L_N$) might be low power lasers. Another alternative for implementation may be envisaged where the modulators ($PM_1$, . . . , $PM_N$) each controls the switching of corresponding Lasers directly.

Figure 3C:
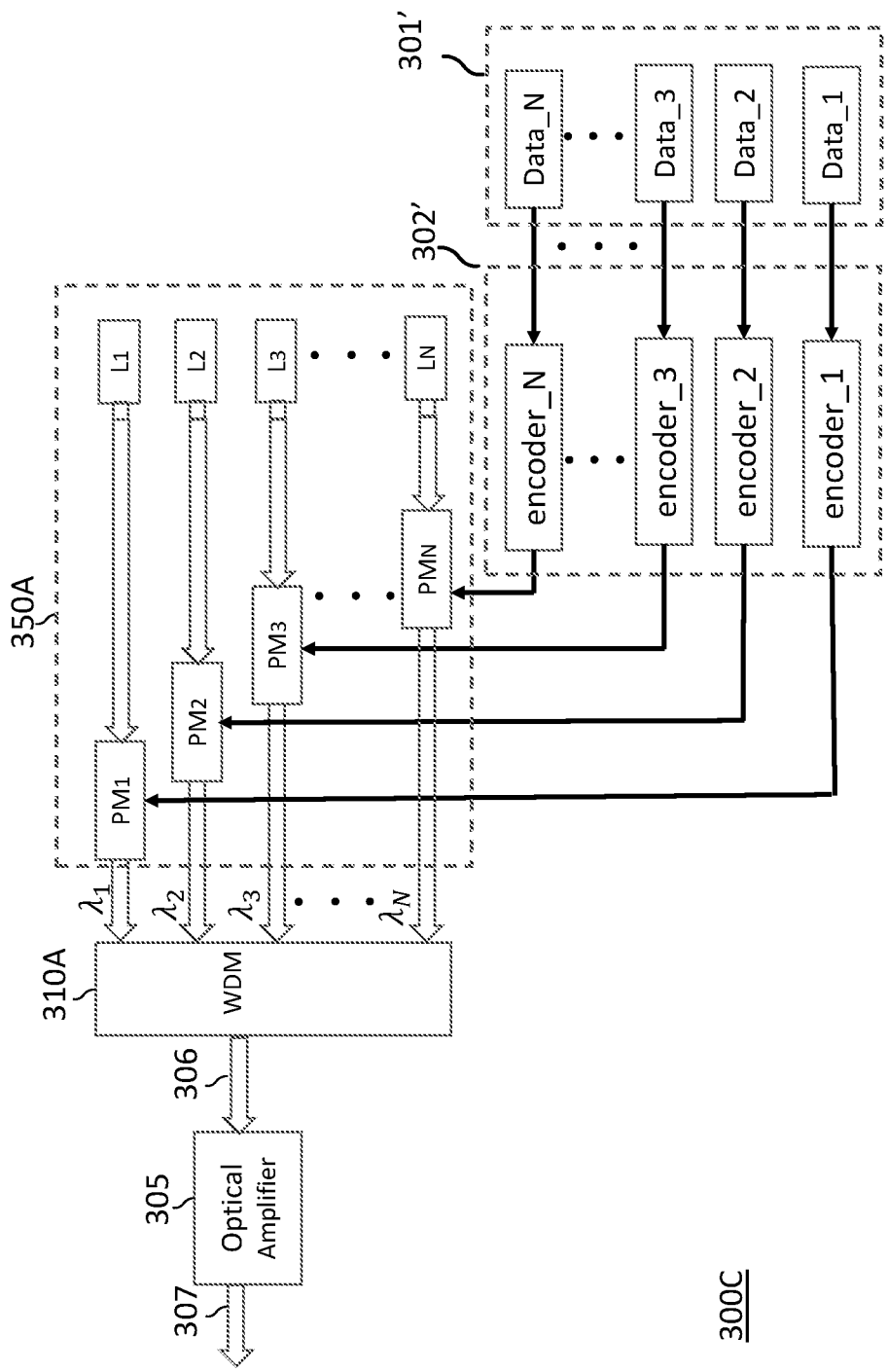
FIG. 3C shows a block diagram of an exemplary two-dimensional M-PPM optical transmitter according to an embodiment of the present disclosure.

FIG. 3C shows a block diagram of an exemplary two-dimensional M-PPM optical transmitter (300C) in accordance with the teachings of the present disclosure. Optical transmitter (300C) of FIG. 3C is similar with optical transmitter (300A) of FIG. 3A, except that transmitter (300C) comprises data block (301) including a plurality of data streams (Data_1, . . . , Data_N) and encoder block (302') including a plurality of encoders (encoder_1, . . . , encoder_N). In the embodiment shown, the encoded data coming out of encoders (encoder_1, . . . , encoder_N) are passed to corresponding modulators ($PM_1$, . . . , $PM_N$).

With further reference to FIG. 3C, in some applications the input data rate can be higher than the data rate that each data stream (Data_1, . . . . Data_N) can possibly generate. In other words, the data rate supported by any of data streams (Data_1, . . . , Data_N) may be up to a certain maximum rate R for the system due some requirements such as implementation and bandwidth for each wavelength. In such applications, the input data stream can be passed through a time demultiplexer can generate N data stream (Data_1, . . . , Data_N), at lower rates up to, for example, R and use the embodiment of FIG. 3C. As a result, by virtue of implementing an embodiment such the one shown in FIG. C, the system in such scenario can support up to (N×R) data rate. According to the teachings of the present disclosure, encoding block (350B) of FIG. 3B may be implemented using a combination of data block (302') and encoder block (350A) of FIG. 3C.

Figure 4A:
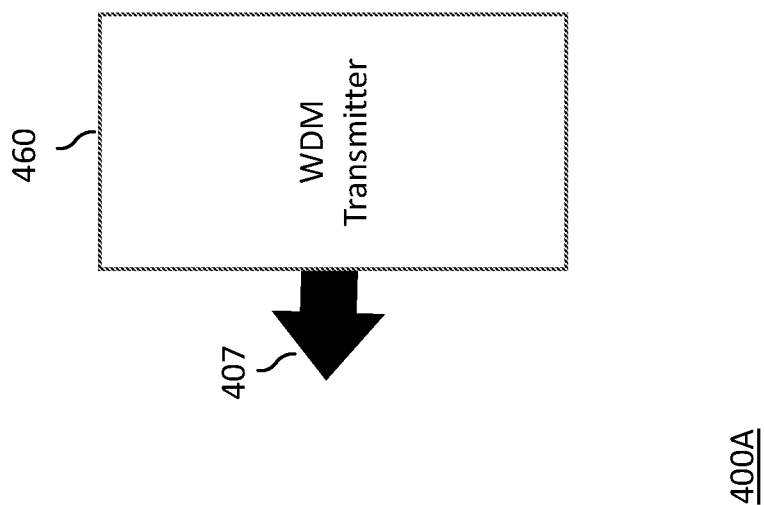
FIG. 4A shows a block diagram of an optical communication system according to an embodiment of the present disclosure.
Figure 4A:
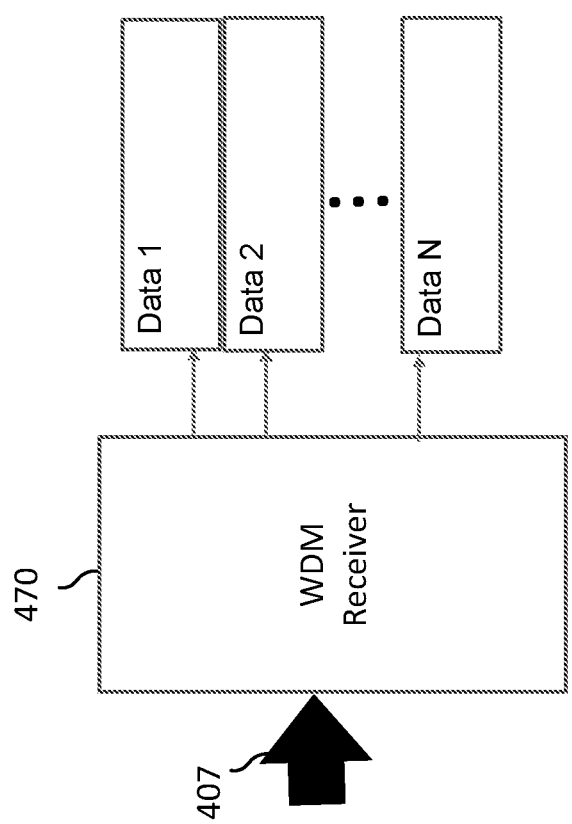

FIG. 4A shows a block diagram of an exemplary optical communication system (400A) according to an embodiment of the present disclosure. Optical communication system (400A) comprises a WDM transmitter (460) and a WDM receiver (470). WDM transmitter (460) includes an encoder block (not shown) implementing a two or three-dimensional M-PPM in accordance with the disclosed teachings. As an example of implementation, WDM transmitter (460) may include encoder block (350A) of FIG. 3A and/or wavelength division multiplexer (310B) of FIG. 3B. Output beam (407) is received by WDM receiver (470) where such beam is demultiplexed and separate bit streams corresponding to each wavelength (Data 1, . . . , Data N) are extracted as shown.

Figure 4B:
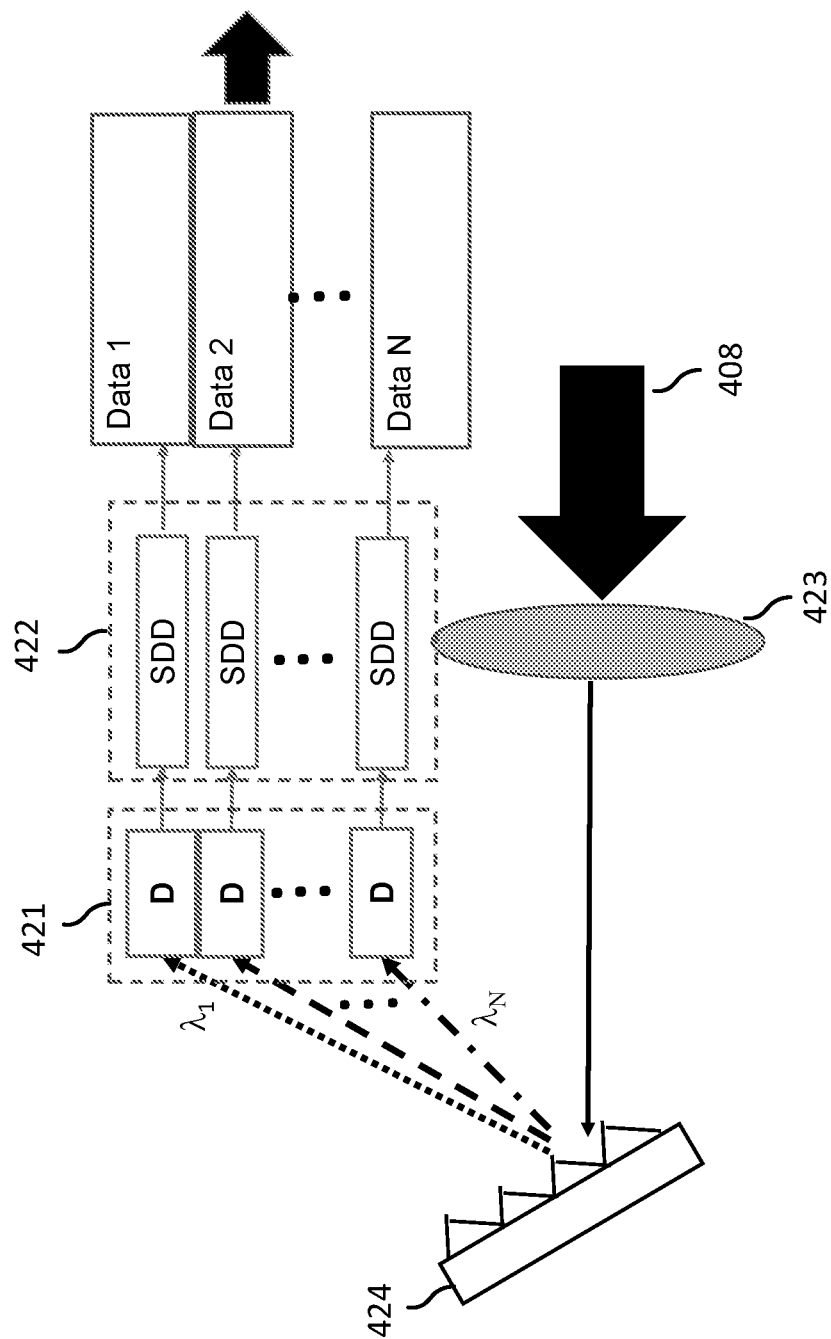
FIG. 4B shows a block diagram of an optical receiver.

With reference to FIG. 4A, WDM receiver (470) may have the structure of any existing optical WDM receiver. FIG. 4B show a WDM receiver (400B) that can be paired with, for example, optical transmitters (300A, 300B) of FIGS. 3A-3B respectively, to implement an end-to-end end optical communication system in accordance with the teachings of the present disclosure. WDM receiver (400B) comprises diffraction grating (424) which functions as an optical demultiplexer. After passing through lens (423), received beam (408) is optically demultiplexed after hitting the diffraction grating (424). As a result of such optical demultiplexing, N different received beams with wavelength ($\lambda_1$, . . . , $\lambda_N$) are generated. WDM receiver (400B) further comprises an optical detector element (421) comprising an array of N photon detectors (D), and a signal processing module (422) comprising an array of signal processing devices (SDD), each signal processing device (SDD) being used for synchronization, demodulation, and decoding of the corresponding channel. In other words, beams with different wavelength ($\lambda_1$, . . . , $\lambda_N$) enter the corresponding photon detectors. The outputs of the photon detectors go through corresponding parallel signal processing devices (SDD) for synchronization, demodulation, and decoding. As a result of such signal processing. N channels of data (Data 1, . . . , Data N) are generated as shown and for further processing. In various embodiments, each photon detector (D) may include a nanowire single photon detector, an avalanche photon detector (APD), or similar detectors.

Figure 4C:
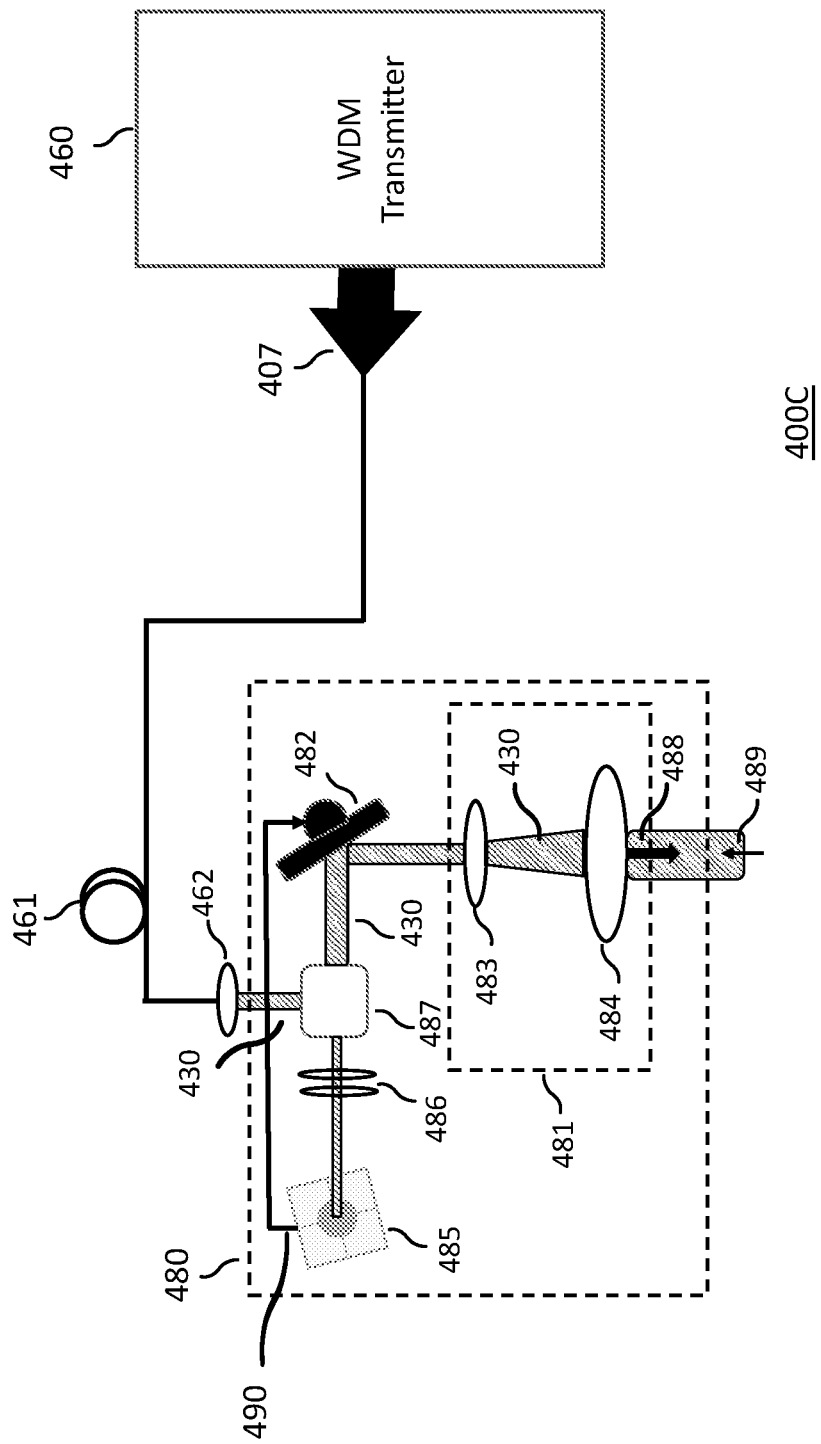
FIG. 4C shows a block diagram of an exemplary optical transmitter according to an embodiment of the present disclosure.

FIG. 4C shows a block diagram of an exemplary optical transmitter (400C) according to an embodiment of the present disclosure. Optical transmitter (400C) comprises WDM transmitter (460), a pointing system (480), optical fiber (461) and convex lens (462). WDM transmitter (460) includes an encoder block (not shown) which may be implemented as a two or three-dimensional M-PPM in accordance with the disclosed teachings. As an example of implementation, WDM transmitter (460) may include encoder block (350A) of FIG. 3A and/or wavelength division multiplexer (310B) of FIG. 3B. As noted above, optical transmitter (400C) further comprises a pointing system (480). Output beam (407) enters optical fiber (461) at one end and is collimated in free space by convex lens (462). Free space beam (430) downstream from convex lens (462) is shown with diagonal strips for distinction from the beam inside the fiber.

With continued reference to FIG. 4C, pointing system (480) represents a beacon-assisted beam director system for space to ground optical communications. In particular, pointing system (480) comprises telescope (481), steering mirror (482), beam splitter (487), narrowband filter (486), and a two-dimensional position sensitive detector array (485). Telescope (481) includes lenses (483, 484) that are used to increase free space beam (430) diameter. An optical beacon (489) at a wavelength substantially different from the space transmit laser wavelength is transmitted from an optical ground station with an angular width sufficient to cover the positional uncertainty of the space transmitter, i.e. WDM transmitter (460). Telescope (481) collects received optical beacon (489) and angularly magnifies rotational spacecraft disturbances by the telescope magnification ratio. The received optical beacon then passes steering mirror (482) used to control the pointing of a narrow transmit beam to the ground receiver. The received optical beacon is then directed to a dichroic beam-splitter (487) to separate the transmit and beacon optical paths. A narrowband filter (486) rejects out-of-band beacon light and the remaining beam is then focused onto a two-dimensional position sensitive detector array (485) that converts the beacon angle to an. Reference signal (490) plus an offset to account for transverse velocity and time-of-flight differences between the transmitter and receiver is then used to control the pointing of the steering mirror (482) to reject spacecraft angular disturbances and ensure that the transmit beam is received at the ground station with high probability.

Figure 4D:
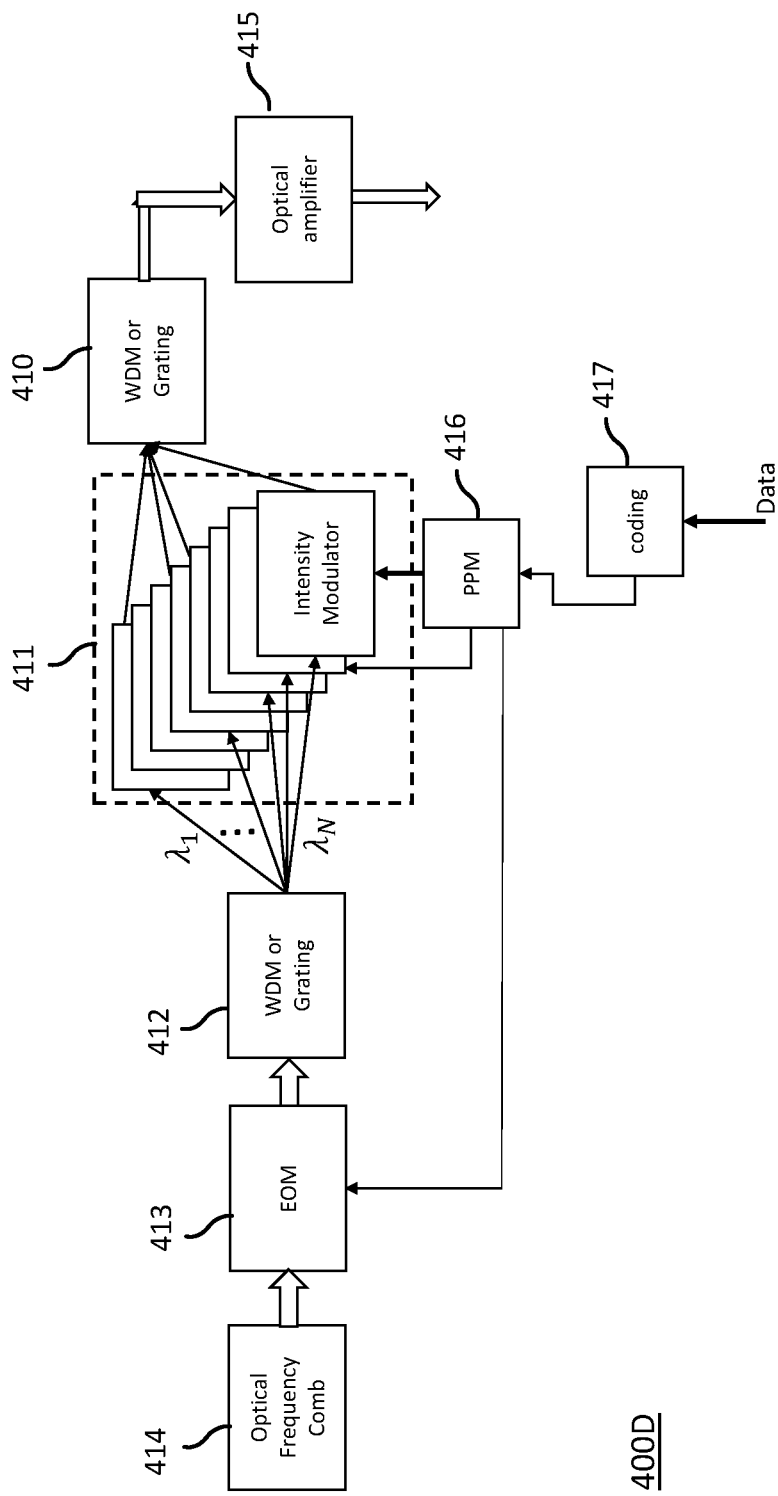
FIG. 4D shows a block diagram of an exemplary optical transmitter according to an embodiment of the present disclosure.

FIG. 4D shows a block diagram of an exemplary two-dimensional M-PPM optical transmitter (400D) according to an embodiment of the present disclosure. Optical transmitter (400D) comprises mode locked laser (414), (EOM) electro-optical modulator (413), optical demultiplexer (412), an array of intensity modulators (411), optical multiplexer (410), optical amplifier (415), two-dimensional M-PPM modulator (416) and coder (417). The array of intensity modulators (411) comprises N intensity modulators each corresponding to one of the wavelengths ($\lambda_1$, . . . , $\lambda_N$). The mode locked laser (414) may be an optical Kerr comb that is used to generate a train of pluses. EOM (413) may be a lithium niobate Mach-Zehnder interferometer used to electro-optically modulate each selected optical pulse to be transmitted. During operation, high speed data is encoded by coder (417) and the coded data is passed to M-PPM modulators. An optical pulse is selected by the two-dimensional M-PPM (416) through EOM (413). Optical demultiplexer (410) then generates N wavelengths ($\lambda_1$, . . . , $\lambda_N$) in correspondence with the intensity modulators within the array of intensity modulators (410). One wavelength, and therefore the intensity modulator corresponding to such wavelength is selected by the M-PPM modulator. The intensity modulated optical pulse is then optically multiplexed through optical multiplexer (410) and then amplified by the optical amplifier (415). The resulting optically amplified beam is then transmitted to the instant user (e.g. a ground optical receiver). In the embodiment shown in FIG. 4D, one M-PPM modulator (416) is used for the entire array of intensity modulators (411). Further embodiments using up to N M-PPM modulators may also be envisaged. As an example, in an embodiment where the number of M-PPM modulators is N, i.e. the number of wavelengths, each intensity modulator will have a corresponding M-PPM modulator.

Figure 4E:
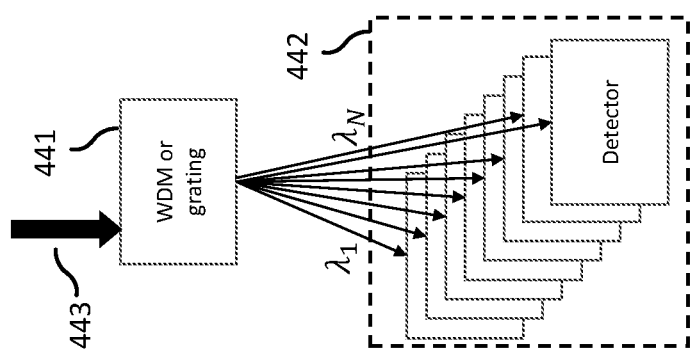
FIG. 4E shows a block diagram of an exemplary optical receiver according to an embodiment of the present disclosure.

FIG. 4E shows a block diagram of an exemplary optical receiver (400E) according to an embodiment of the present disclosure. Such optical receiver may be paired with, for example, optical transmitter (400D) to implement, for example, a space-ground communication system. Optical receiver (400E) comprises an optical demultiplexer (441) and an array of photon detectors (442) including N photon detectors corresponding to N wavelengths ($\lambda_1$, . . . , $\lambda_N$). The received beam (443) at a wavelength is directed to one of N detectors corresponding to such wavelength, and after passing through optical demultiplexer (442).

With reference to embodiments of FIGS. 4D and 4E, coding and decoding for both methods are performed across all wavelengths and time slots of the M-PPM scheme. Optical multiplexers and demultiplexers as shown in FIGS. 4D and 4E may be implemented using diffraction gratings.

Communication systems implementing wavelength division multiple access (WDMA) may also benefit from the disclosed devices and methods. As an example, with reference to FIG. 3A, in a system with multiple CubeSats or small (compact) spacecrafts used for long range space optical communication, encoder (350A) may be implemented such that each of lasers ($L_1, \ldots, L_N$) is i) disposed within and is ii) dedicated to a corresponding spacecraft distanced from other spacecrafts.

Furthermore, communication systems using a combination of WDMA and coded division multiple access (CDMA) may also be implemented based on the disclosed teachings. For such systems, a few signature codes may be used per each wavelength. If S is the number of distinct signature sequences with acceptable autocorrelation and low cross-correlation, and if N different wavelengths are used, then a system with S×N CubeSats or small spacecraft can be supported. Such system can simultaneously communicate to, for example, an earth station. For an optical CDMA system at a certain wavelength to support a number of users greater than 15, long signature sequences with lower chip durations are required if the PPM slot duration is a few nano-seconds. Current laser technology may not allow to use very short chip duration in such cases. For sequences having a cross-correlation of 1, the length of sequence, denoted by L, should be greater than the number of users S times approximately the square of the weight of sequences. Therefore, in order to have short sequences the number of users S should be decreased in order to reduce the length of sequence L. In order words, combining WDMA and CDMA as disclosed, provides solution to support S×N users with good performance even if S is small to meet the technology constraint on chip duration.

Figure 5A:
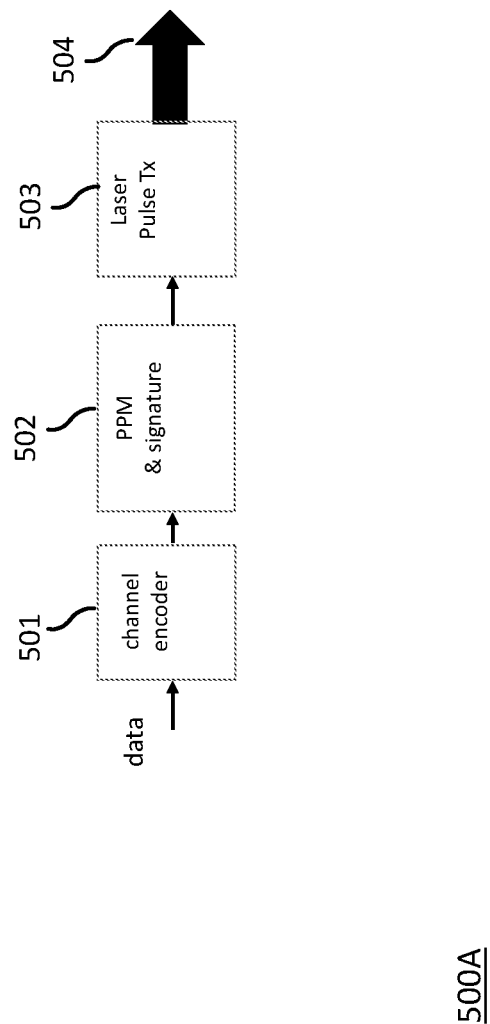
FIG. 5A shows a block diagram of an exemplary optical transmitter according to an embodiment of the present disclosure.

Continuing with the above-disclosed teachings of combining WDMA and CDMA, reference is made to FIG. 5A showing a block diagram of an exemplary two-dimensional M-PPM optical transmitter (500A) according to an embodiment of the present disclosure. Such transmitter represents a transmitter for one out of S users in correspondence with one of the wavelengths, e.g. $\lambda_i$ out of N wavelengths ($\lambda_1, \ldots, \lambda_N$). Optical transmitter (500A) comprises a channel encoder (501), M-PPM modulator (502), and laser (503). High speed data is first being encoded through channel encoder (501). Laser (503) is then modulated through the M-PPM (502) modulator based on the encoded data and the specific sequence assigned to the user. The resulting beam (504) is then transmitted to the distant user. As there are S users (i.e. S signature codes) per wavelength $\lambda_i$, on the receive side, S parallel optical receivers (i.e. parallel CDMA optical receivers), each corresponding to one of the signature codes (i.e. user) may be implemented. An exemplary application that could benefit from the above-disclosed teachings is a communication system including a plurality of satellites. In such system the plurality of satellites may be divided into a number of satellite groups, each group including one or more satellite, and each group may be assigned a corresponding wavelength out of, for example, N wavelength ($\lambda_1, \ldots, \lambda_N$). Continuing with the same example, each satellite within each satellite group may be assigned one of the, for example, S different signature codes.

Figure 5B:
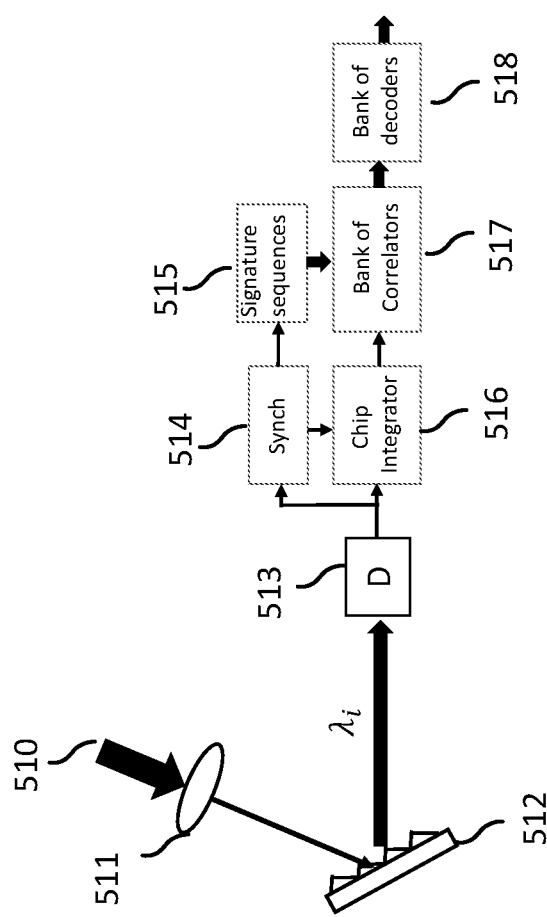
FIG. 5B shows a block diagram of an exemplary optical receiver according to an embodiment of the present disclosure.

FIG. 5B shows an exemplary block diagram of an optical receiver (500B) representing one of such receivers, in accordance with an embodiment of the present disclosure. After passing through lens (511), the received beam (510) is demultiplexed into its wavelength constituents by diffraction grating (512), and each beam then enters a corresponding photo diode (513), thereby generating a corresponding electric signal. On the electronic side, and similarly to typical CDMA receivers, optical receiver (500B) comprises integrators (516), a bank of correlators (517), a bank of decoders (518) and a synchronization circuit (514). Such elements are used to decode the actual received data bits based on correlating the received bit stream with the signature codes (515) and to identify the user associated with the transmission of the received data.

Binary signature spreading sequences with 0's and 1's are used to have good autocorrelation, and cross-correlation properties. The autocorrelations should have small out-of-phase values and the cross-correlation should be low. In what follows, short binary signature spreading sequences of length L and weight w with cross correlation CR=1 are considered. That is, the maximum cross-correlation and maximum off-peak autocorrelation should be upper bounded by 1 for all possible nonzero time shifts. Thus, for the autocorrelation function of user u with the same wavelength the spreading sequence $C^u$ the following can be written $$R_l(C^u, C^u) = \Sigma_i c_i^u c_{i+l}^u \leq 1 \text{ for } l \neq 0 \quad (1)$$

and $$R_l(C^u, C^u) = \Sigma_i c_i^u c_{i+l}^u = w \text{ for } l=0 \quad (2)$$

The cross correlation between any two users $u_1$ and $u_2$ must likewise satisfy $$R_l(C^{u1}, C^{u2}) = \Sigma_i c_i^{u1} c_{i+l}^{u2} \leq 1 \text{ for all possible } l \quad (3)$$

The maximum of such cross-correlation is denoted by CR and here CR=1. For a combination of optical WDMA and CDMA, if a typical PPM slot time is about 1 nanosecond, short sequences allow a reasonable chip duration supported by current technology. Lasers that produce pulse widths in the range of a few picoseconds are not available yet. Signature sequences with a cross-correlation of 1 and length L=341 can be used to produce weight w=5. This makes sense if the PPM slot duration is large enough. Use of a length 341 in each slot of PPM modulation that can be in the range of less than a few nanoseconds, would result in very narrow chip pulses for which no such lasers currently exist. To generate short sequences with reasonable weights, w=3 can be used as it provides a lower number of users per each wavelength. The length of sequences can also be decreased. The number of such sequences is bounded by $$S \leq \frac{1}{w} \frac{L-1}{w-1} \quad (4)$$

As an example, a cross-correlation of CR=1 and weight w=3 which provides substantially shorter sequence of length L=31 may be selected. There are exactly 5 of such sequences.

Combination of WDMA with optical CDMA to support more users is analyzed in sections 6-8 (and related figures) of the above mentioned U.S. provisional No. 63/115,772 filed on Nov. 19, 2020 and incorporated herein by reference in its entirety. In particular, short signature sequences can be used, together with uncoded 2-PPM modulation and simulations for a coded system.

The invention claimed is:

1. A communication system including an optical transmitter, the optical transmitter comprising:
    a mode locked laser configured to generate a train of optical pulses;
    an electro-optic modulator (EOM) configured to receive the train of optical pulses;
    a pulse position modulator;
    an optical demultiplexer and an optical multiplexer;
    a plurality of intensity modulators;

wherein:
the pulse position modulator is configured to receive data bits, and based on the received data bits, to select an optical pulse through the EOM at a selected time slot of plurality of time slots;
the optical demultiplexer is configured to demultiplex a selected optical pulse into a plurality of beams with corresponding plurality of wavelengths;
the pulse position modulator is further configured to select, in correspondence with a wavelength, an intensity modulator of the plurality of the intensity modulators;
the selected intensity modulator is configured to modulate the selected optical pulse to generate an intensity modulated optical pulse; and
the optical multiplexer is configured to multiplex the intensity modulated optical pulse to generate an optically multiplexed signal.

2. The communication system of claim 1, wherein the data bits are encoded data bits.

3. The communication system of claim 2, further comprising an optical amplifier configured to optically amplify the optically multiplexed signal.

4. The communication system of claim 1, further comprising an optical receiver, the optical receiver comprising an optical demultiplexer configured to receive the optically multiplexed signal and to demultiplex the optically multiplexed signal into a plurality of optical beam with the corresponding plurality of wavelengths.

5. The communication system of claim 4, further comprising a plurality of photon detectors, configured to receive corresponding optical beams to generate a plurality of corresponding electric signals.

6. The communication system of claim 5, further comprising a plurality of signal processing devices, each configured to:
receive the corresponding electric signal; and
perform a synchronization, a demodulation, and a decoding function to generate data bits for further processing.

7. The communication system of claim 1, wherein the optical multiplexer comprises a lens and a diffraction grating.

8. The communication system of claim 5, wherein the plurality of photon detectors comprises nanowire single photon detectors, or avalanche photon detectors.

9. The communication system of claim 4, wherein the optical demultiplexer comprises a lens and a diffraction grating.

10. The communication system of claim 1, wherein the optical multiplexer comprises a diffraction grating.

11. The communication system of claim 4, where the optical transmitter is disposed in a spacecraft and the optical receiver is located at a ground station.

12. The communication system of claim 11, further comprising a pointing system configured to transmit the optically multiplexed signal in a direction of the optical receiver.

13. The communication system of claim 1, wherein the mode locked laser is an optical Kerr comb.

14. The communication system of claim 1, wherein the EOM comprises a lithium niobate Mach-Zehnder interferometer.

15. The communication system of claim 12, wherein the pointing system comprises a telescope, the telescope being configured to receive an optical beacon from the ground station.

16. The communication system of claim 15, wherein the telescope is configured, based on the received optical beacon, to angularly magnify rotational spacecraft disturbances.

17. The communication system of claim 12, wherein the pointing system is disposed downstream of the optical amplifier.

* * * * *